(12) United States Patent  
Babando et al.

(10) Patent No.: US 8,760,101 B2  
(45) Date of Patent: Jun. 24, 2014

(54) ELECTRICAL ACTUATOR AND METHOD FOR CONTROLLING SUCH AN ACTUATOR

(75) Inventors: Olivier Babando, Toulouse (FR); Laurent Steiner, Cugnaux (FR)

(73) Assignee: Airbus Operations (SAS), Toulouse Cedex (FR)

( * ) Notice: Subject to any disclaimer, the term of this patent is extended or adjusted under 35 U.S.C. 154(b) by 312 days.

(21) Appl. No.: 13/417,387

(22) Filed: Mar. 12, 2012

(65) Prior Publication Data

US 2012/0235620 A1 Sep. 20, 2012

(30) Foreign Application Priority Data

Mar. 15, 2011 (FR) ..................................... 11 52095

(51) Int. Cl.  
*G05B 5/00* (2006.01)  
*F15B 15/18* (2006.01)  
*B64C 13/50* (2006.01)  
*F15B 21/08* (2006.01)  
*F15B 7/00* (2006.01)

(52) U.S. Cl.  
CPC ............... *B64C 13/50* (2013.01); *F15B 15/18* (2013.01); *F15B 21/087* (2013.01); *F15B 7/006* (2013.01)  
USPC .......................................... 318/471; 318/461

(58) Field of Classification Search  
USPC ................ 318/471, 461; 417/44.11; 222/1  
See application file for complete search history.

(56) References Cited

U.S. PATENT DOCUMENTS

| 5,443,180 | A * | 8/1995 | Dussau ............................. 222/1 |
| 7,191,593 | B1 | 3/2007 | Ho |
| 2008/0236156 | A1 | 10/2008 | Kakino et al. |
| 2010/0308179 | A1 | 12/2010 | Babando et al. |

FOREIGN PATENT DOCUMENTS

| FR | 2807007 | 10/2001 |
| FR | 2946401 | 12/2010 |
| JP | 2002054604 | 2/2002 |

OTHER PUBLICATIONS

French Patent Office, French Search Report FR 1152095 (2 pgs), Nov. 14, 2011.

* cited by examiner

*Primary Examiner* — Karen Masih  
(74) *Attorney, Agent, or Firm* — Wood, Herron & Evans, LLP

(57) ABSTRACT

An electrical actuator limits the speed of the electric motor which controls the hydraulic pump of the actuator, during the opening of a pressure relief valve. To this end, the electrical actuator applies an auxiliary set-point speed value to the electric motor to avoid damage that may be caused by overheat at the actuator.

11 Claims, 3 Drawing Sheets

ELECTRICAL ACTUATOR AND METHOD FOR CONTROLLING SUCH AN ACTUATOR

TECHNICAL FIELD

The present invention relates to an electrical actuator and a method for controlling such an actuator.

BACKGROUND

An electrical actuator, that is one using an electrical power in order to operate, could be intended more particularly, although not exclusively, for actuating a control surface of an aircraft, including of a transport airplane, for instance a horizontal rudder, a direction control surface or a lateral control surface of an airplane.

Such an electrical actuator could be an electro-hydrostatic actuator of the EHA (<<Electro-Hydrostatic Actuator>>) type, usually comprising an electronic module, an electric motor, a hydraulic pump, a pressure relief valve, a hydraulic block and a hydraulic jack. Such actuator is controlled by a control current sent to the electronic module. A local slaving system in the electronic module converts this control current into a speed set-point for the electric motor. The latter drives the hydraulic pump using an electric power supplied by the aircraft. The pump then locally generates a hydraulic power for moving the hydraulic jack.

The present invention could also apply to an electrical backup hydraulic actuator, of the EBHA (<<Electrical Backup Hydraulic Actuator>>) type, being a hybrid actuator comprising the characteristics both of a usual hydraulic servo-control and of an electro-hydrostatic actuator of the EHA type. In a nominal situation (failure free), the EBHA actuator operates as a usual servo-control. On the other hand, in the case of a failure affecting the hydraulic mode, this EBHA actuator switches to a power supply and operates as an EHA actuator.

Because of its technology, an EHA actuator is able to locally generate more effort than the maximum level required for its operation. There is thus the risk that the structure on which the EHA actuator is mounted would be submitted to more important efforts than the level for which it has been dimensioned. Thus, in order to protect such a structure, the EHA actuators are generally provided with at least one pressure relief valve limiting the effort generated by the actuator.

It should be noticed, that, in some configurations, the EHA actuator could be caused to operate on the pressure relief valve. In such a case, the motor operates and the hydraulic pump generates a flow circulating in the pressure relief valve instead of supplying the chambers in the jack.

In such a situation, i.e. with a circulation of fluid being maintained between the pump and the pressure relief valve, the EHA actuator could very quickly become damaged, in such an extent that it could no longer be used.

The failure of the actuator could result from two different origins:

an overheat of the fluid. The fluid circulating between the hydraulic pump and the pressure relief valve switches from the opening pressure of the pressure relief valve to the pump return pressure when going thru the pressure relief valve, resulting in overheating the latter very rapidly. Such a heat being stored in the fluid is afterwards dissipated throughout the whole actuator. The resulting increase of the temperature could quickly lead to the actuator becoming damaged; and the control electronics. When the pressure relief valve is opened and fluid circulates therethrough, the electric motor should supply a high torque for generating the opening of the pressure relief valve, at a speed depending on the slaving error that could thus reach the maximum speed. In order to maintain such a high torque, a current, being also high, should circulate in the electronic module of the actuator. As the electronics of the actuator is not dimensioned for bearing such a level of current permanently, the latter could become damaged very quickly.

From FR-2,946,401 of the Applicant, an electrical actuator is known, allowing the above mentioned drawbacks to be overcome. Such an actuator is of the type comprising a control module, an electric motor driving a pump according to a set-point value received from said control module, a hydraulic jack comprising two chambers able to be supplied by the pump and generating the effort of the actuator, as well as at least one pressure relief valve for limiting the effort generated by the actuator. According to FR-2,946,401, such an actuator further comprises means for measuring the difference of pressure existing between the two chambers of the hydraulic jack, means for calculating a corrective parameter by means of this difference of pressure, and means for calculating, from said corrective parameter, an auxiliary set-point value allowing, when being applied to the electric motor, to limit the difference of pressure between the two chambers of the hydraulic jack to a limit pressure being lower than an opening pressure of the pressure relief valve. Thus, in order to protect the electrical actuator from being damaged as a result of overheat, FR-2,946,401 provides means allowing to avoid, upon its operation, the opening of the pressure relief valve(s) and thereby to prevent overheating.

Although efficient, the solution provided by FR-2,946,401 could not be used if the accuracy of the sensors and the characteristics of the pressure relief valves of the actuators are such that they cannot allow the opening of the pressure relief valves to be prevented, while meeting the performance requirements of the actuators.

The present invention provides an alternative solution enabling to overcome the above mentioned drawbacks.

SUMMARY OF THE INVENTION

To this end, according to the invention, said actuator of the type comprising:

a control module receiving a control electric signal and converting this control electric signal into a set-point value for an electric motor;

said electric motor driving a pump according to said set-point value received from said control module;

said pump generating a hydraulic power allowing to move a hydraulic jack;

said hydraulic jack comprising two chambers able to be supplied by said pump and generating the effort of the actuator, said chambers being separated by one piston connected to a stem; and at least one pressure relief valve for limiting the effort generated by said actuator, said pressure relief valve being automatically opened so as to implement its limitation function when the difference of pressure between the two chambers reaches a predetermined value, is remarkable in that it further comprises:

first means for implementing monitoring so as to be able to detect an opening of said pressure relief valve;

second means for calculating, upon detection of an opening of said pressure relief valve, an auxiliary set-point value allowing, when being applied to the electric motor, to limit the speed of the latter to a predetermined maximum speed; and third means for applying to said electric motor said auxiliary set-point value, instead of said set-point value, upon detection of an opening of said pressure relief valve.

Thereby, thanks to the invention, for protecting the electrical actuator from being damaged as a result of an overheat, means are provided for calculating an auxiliary set-point value that will be applied to the electric motor, upon the detection of an opening of said pressure relief valve. This auxiliary set-point value is applied to the electric motor so that it limits its speed and hence, its action on the hydraulic pump. The speed is limited to said predetermined maximum speed, being lower than the tolerated maximum speed of the motor and being defined so as to prevent any overheat of the actuator able to damage it when being applied to the motor, even permanently.

In a preferred embodiment, said first means comprise:

a first element for measuring the current motor speed of said electric motor;

a second element for measuring the current speed of the stem of said hydraulic jack;

a third element for calculating, from the measured current speed of said stem, an estimated speed, representing the speed of the motor allowing to generate said measured current speed for the stem of the hydraulic jack;

a fourth element for calculating the difference between said estimated motor speed and said current motor speed; and a fifth element for comparing this difference to a predetermined maximum value, and for detecting an opening of said pressure relief valve, for which said auxiliary set-point value is applied to said electric motor, when this difference is higher than said predetermined maximum value.

In addition, advantageously, said first means further comprise a sixth element for filtering said difference between said estimated motor speed and said current motor speed, before transmitting it to said fifth element.

Furthermore, in a preferred embodiment, said third element comprises means for calculating said estimated motor speed Vest, by means of the following expression:

$$Vest=(S\cdot Vram)/cyl$$

wherein:

S represents the surface of the cross-section of the piston of said hydraulic jack;

Vram is the measured current speed of the stem of the hydraulic jack; and cyl represents the capacity of the pump (that is the volume of the fluid being moved when the pump achieves one revolution).

In a particular embodiment, said actuator further comprises:

means for determining whether the control electric signal has the effect of generating an increasing difference of pressure or a decreasing difference of pressure in the hydraulic jack; and means for inhibiting the application, if appropriate, of said auxiliary set-point value to said electric motor (and therefore applying said set-point value), when said control electric signal being received has the effect of generating a decreasing difference of pressure in absolute value, that is a difference of pressure tending to decrease.

Thus the application of the auxiliary set-point value is inhibited, that is the limitation of the effort generated by the actuator, when the set-point value being applied aims at reducing the difference of pressure existing between the two chambers of the hydraulic jack. In such a case, the full authority is supplied to the actuator for reducing such a difference of pressure, deactivating the above mentioned protection (that is the limitation) function.

The present invention also relates to a control system for a control surface, in particular a (lateral, direction, depth) control surface of an aircraft, including of a transport airplane. This control system of the type comprising:

a control means allowing to generate a control electric signal; and an actuator receiving said control electric signal and generating an effort on the control surface as a function of said control electric signal, is remarkable in that said actuator is of the above mentioned type according to the invention.

The present invention also relates to an aircraft, in particular a transport airplane, comprising an actuator and/or a control system of a control surface, such as specified hereinabove.

Furthermore, the present invention relates to a method for controlling an actuator of the above mentioned type. This method aims at automatically protecting the actuator from an overheating upon an operation.

According to the invention, said method is remarkable in that, automatically, a monitoring is implemented, so as to be able to detect an opening of a pressure relief valve, and upon the detection of an opening of a pressure relief valve, automatically:

an auxiliary set-point value is calculated allowing, when applied to the electric motor, to limit the speed of the latter to a predetermined maximum speed; and said auxiliary set-point value is applied to said electric motor instead of said set-point value.

Thus, thanks to invention, the speed of the electric motor is limited upon the opening of said pressure relief valve and hence, so is its action on the hydraulic pump. The speed is limited to said predetermined maximum speed, being lower than the tolerated maximum speed of the motor and being defined so as to prevent any overheat of the actuator able to damage it when being applied to the motor.

Advantageously, for implementing said monitoring:

the current motor speed of said electric motor is measured;

the speed of the stem of said hydraulic jack is measured;

from the measured current speed of said stem, an estimated speed is calculated, representing the speed of the motor allowing to generate said measured current speed for the stem of the hydraulic jack;

the difference is calculated between said estimated motor speed and said current motor speed; and the difference is compared to a predetermined maximum value, and an opening is detected of said pressure relief valve, for which said auxiliary set-point value is applied to said electric motor, when such difference is higher than said predetermined maximum value.

Preferably said difference between the estimated motor speed and the current motor speed is filtered, before being compared to said predetermined maximum value.

In addition, advantageously, said estimated motor speed Vest is calculated, by means of the following expression:

$$Vest=(S\cdot Vram)/cyl$$

wherein:

S represents the surface of the cross-section of the piston of said hydraulic jack;

Vram is the measured current speed of the stem of the hydraulic jack; and cyl represents the capacity of the pump (that is the volume of the fluid being moved when the pump achieves one revolution).

Furthermore, advantageously, automatically and repeatedly:

it is determined whether the control electric signal being received has the effect of generating an increasing difference of pressure or a decreasing difference of pressure in the hydraulic jack; and if appropriate, the application of said auxiliary set-point value is inhibited, when said control electric signal being received has the effect of generating a decreasing difference of pressure in absolute value.

The method according to the present invention therefore enables:

to guarantee the stop load of the actuator, specified by the flight qualities;

to accept the opening of the pressure relief valve, controlling the speed of the motor of the actuator so as to limit the overheat; and not to use the measurement of the sensor of pressure difference between the chambers of the actuator (except in order to know the sign of the difference of pressure so as to activate or not the function of overheat limitation according to the invention).

BRIEF DESCRIPTION OF THE DRAWINGS

The FIGURES of the appended drawing will better explain how this invention could be achieved. In these FIGURES, like reference numerals relate to like components.

DETAILED DESCRIPTION

Figure 1:
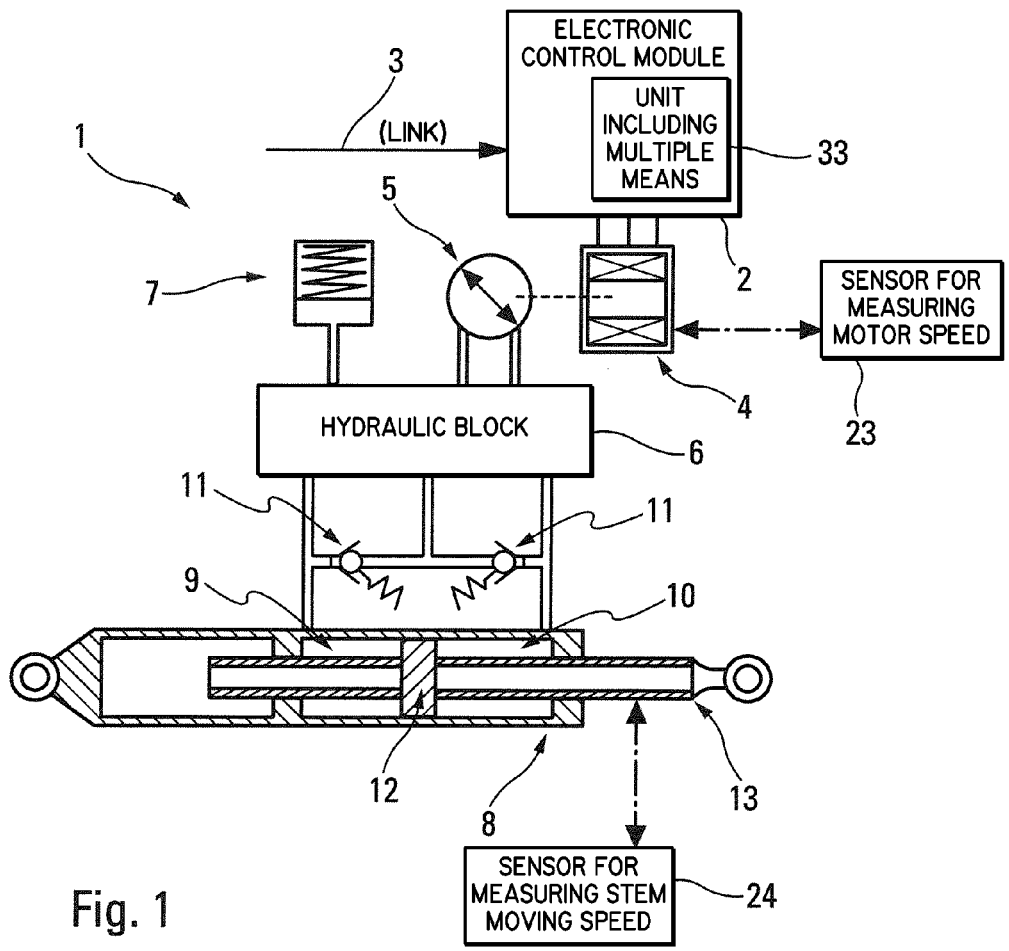
FIG. 1 schematically illustrates an actuator according to the invention.

The actuator 1 according to the invention and schematically illustrated on FIG. 1 is an electrical actuator, i.e. an actuator using an electric power for operating. Such an actuator 1 is adapted for actuating (that is moving) a mechanical member, in particular a control surface of an aircraft, including of a transport airplane. According to the invention, such an actuator 1 is improved so as to be protected from being damaged as a result of an overheating.

Said actuator 1 is of the type comprising:

an electronic control module 2 receiving a control electric signal (to be set forth below) via a link 3 and converting this control electric signal into a (speed) set-point value I0 for an electric motor 4;

said electric motor 4 driving a hydraulic pump 5, according to the speed set-point value I0 received from said control module 2;

said pump 5 being associated to this hydraulic block 6 further comprising an accumulator 7 and generating a hydraulic power according to the driving achieved by said electric motor 4. This hydraulic power allows to move a hydraulic jack 8; and said hydraulic jack 8 comprising two chambers 9 and 10 able to be supplied by said pump 5 and separated by a piston 12 connected to a stem 13. Said hydraulic jack 8 is usually moved as a function of the difference of pressure existing in these two chambers 9 and 10. Moving said hydraulic jack 8 generates the effort produced by the actuator 1 on the mechanical member it operates, in particular, a control surface of an aircraft.

Said actuator 1 further comprises one or more current pressure relief valves 11 allowing the effort it generates to be limited. Each pressure relief valve 11 is associated with an opening pressure representing a difference of pressure between the chambers 9 and 10, for which the pressure relief valve 11 is automatically opened so as to implement its protection function. Indeed, usually, a pressure relief valve is formed so as to automatically open under the effect of a predetermined pressure of fluids, to then evacuate a fluid flow rate so as to limit the pressure in the chambers and to close when normal service conditions have been restored.

Said actuator 1 being an electrical actuator could correspond to an electro-hydrostatic actuator of the EHA (<<Electro-Hydrostatic Actuator>>) type. It could then be an electrical backup hydraulic actuator of the EBHA (<<Electrical Backup Hydraulic Actuator>>) type, when it operates in the electric mode. Such an EBHA actuator is a hybrid actuator comprising the characteristics both of a usual hydraulic servo-control and of an electro-hydrostatic actuator of the EHA type. In a nominal situation (failure free), the EBHA actuator operates as a usual servo-control. On the other hand, in the case of a failure affecting the hydraulic mode, this EBHA actuator switches to an electric mode and operates as an EHA actuator.

Figure 2:
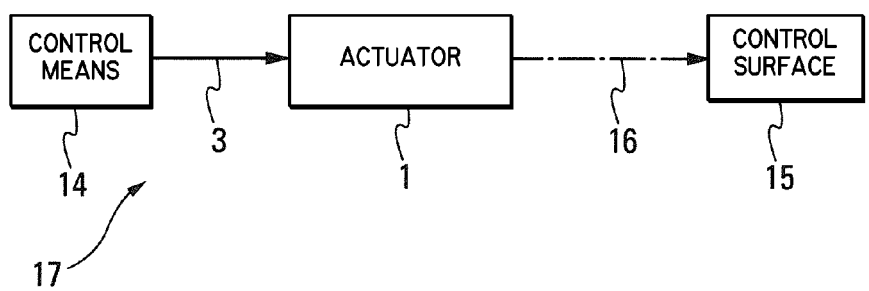
FIG. 2 is the block diagram of a control system of a control surface according to the invention.

Although not exclusively, said actuator 1 can be used more particularly for actuating a control surface of an aircraft, including of a transport airplane, for instance a depth control surface, a direction control surface or a lateral control surface of an airplane. In such an application, said actuator 1 could be part of a control system 17 of a control surface further comprising, as shown on FIG. 2:

a control means 14 allowing to generate the control electric signal being transmitted via the link 3 to the control module 2 of the actuator 1. Such a control means 14 could comprise usual manual means, for instance a handle or a control member, allowing an operator, in particular the pilot of the aircraft, to generate a control signal with a view to moving a control surface 15. Such a control means 14 could further comprise usual automatic means allowing to automatically generate, in particular, from measured values, a control electric signal; and said control surface 15, for instance a lateral, depth or direction control surface being moved by said actuator 1 (or by a plurality of actuators 1), as illustrated by a link 16 in dash-dots on FIG. 2.

Figure 3:
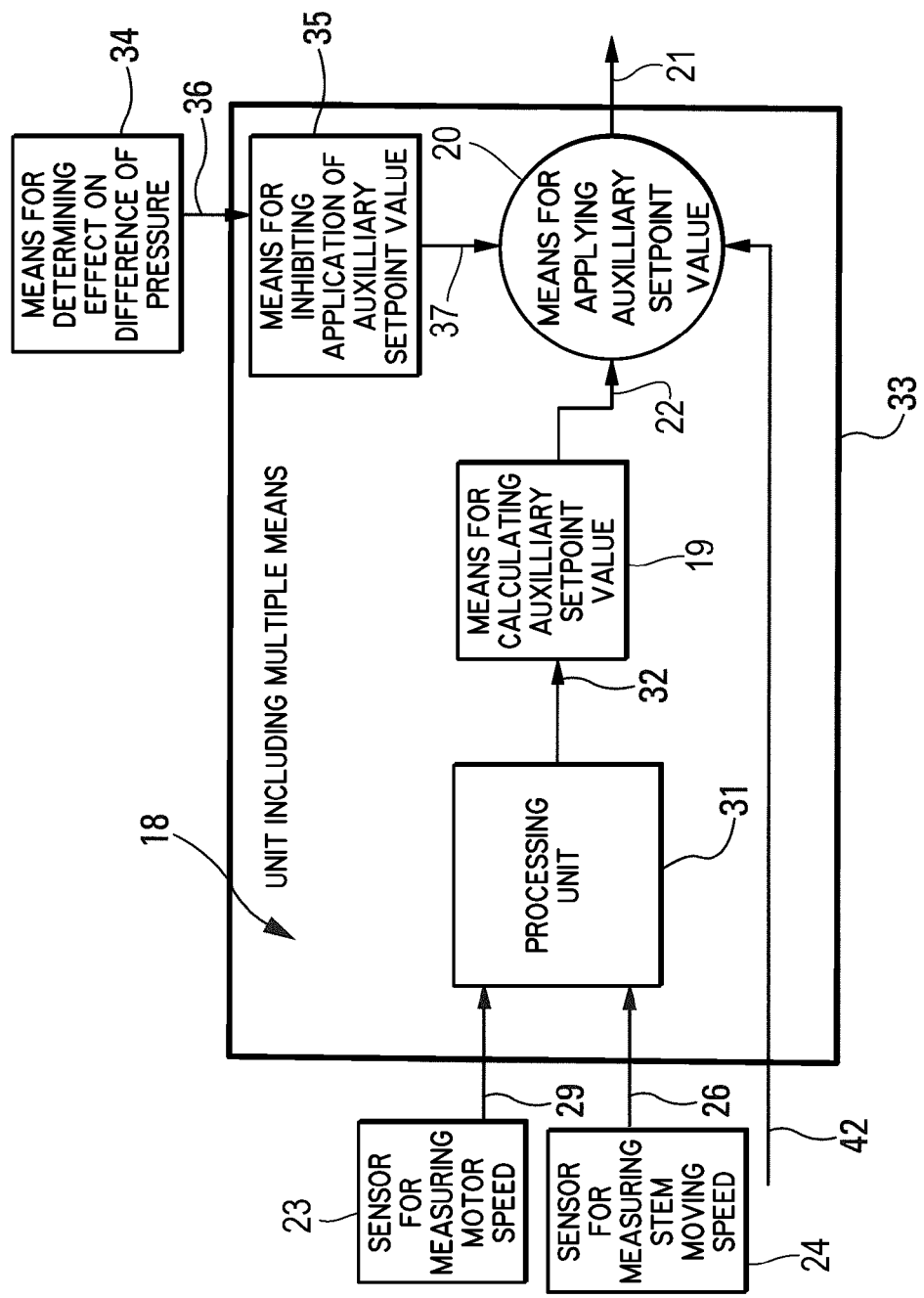
FIG. 3 is a block diagram of a means included in an electronic control module of the actuator of FIG. 1.

According to the invention, for protecting such an actuator 1 from being damaged as a result of an overheating, the latter further comprises, as shown on FIG. 3:

means 18 for implementing a monitoring so as to be able to detect an opening of said pressure relief valve 11;

means 19 for calculating, upon the detection of an opening of a pressure relief valve 11, an auxiliary set-point value Iaux allowing, when being applied to the electric motor 4, to limit the speed of the latter to a predetermined maximum speed; and means 20 for applying (via a link 21) to said electric motor 4 said auxiliary set-point value Iaux (received from means 19 via a link 22), instead of said set-point value I0, upon the detection of an opening of a pressure relief valve 11.

Consequently, for being protected from being damaged as a result of an overheat, the electrical actuator 1 is provided with means 19 intended for calculating an auxiliary set-point value Iaux that will be applied to the electric motor 4, upon the detection (by means 18) of an opening of said pressure relief valve 11. This auxiliary set-point value Iaux is applied to the electric motor 4 so that it limits its speed and, hence, the action thereof upon the hydraulic pump 5. Its speed is then limited to said predetermined maximum speed, being lower than the tolerated maximum speed of the motor 4. This predetermined maximum speed is defined so as to prevent an overheating of the actuator 1 able to damage it when it is applied to the motor 4. This maximum speed is determined usually, in particular, by means of tests.

Figure 4:
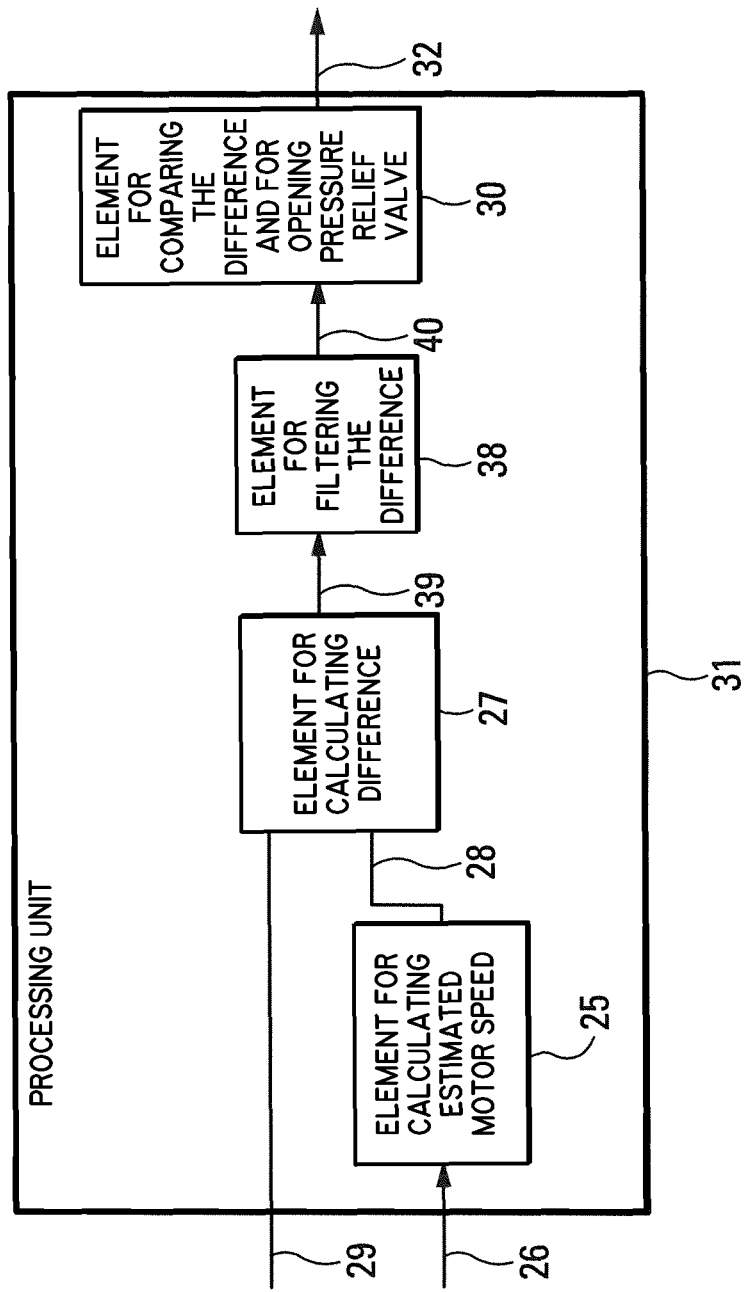
FIG. 4 is a block diagram of a processing unit included in the means of FIG. 3.

In a preferred embodiment, said means 18 comprise:
- a usual sensor 23 for measuring the current motor speed of the electric motor 4;
- a usual sensor 24 for measuring the current moving speed of the stem 13 of the hydraulic jack 8; and
- a processing unit 31 being connected by a link 32 to the means 19 and comprising, as shown on FIG. 4:
  - an element 25 for calculating an estimated motor speed, from the current speed of said stem 13 being measured and received via a link 26 from the sensor 24. The estimated motor speed represents the speed of the motor 4 allowing to generate said measured current speed for the stem 13 of the hydraulic jack 8;
  - an element 27 for calculating the difference between said estimated motor speed (received via a link 28 from the element 25) and said measured current motor speed (received via a link 29 from the sensor 23); and
  - an element 30 for comparing said difference to a predetermined maximum value, and for detecting an opening of a pressure relief valve 11, for which the means 20 should apply said auxiliary set-point value to said electric motor 4, when such difference is higher than said predetermined maximum value.

Indeed, when the pressure relief valve 11 is opened, a part of the flow generated by the pump 5 (under the control of the motor 4) circulates thru the pressure relief valve 11, instead of supplying one chamber of the hydraulic jack 8. As this part of the flow could be significant, the speed of the stem 13 of the hydraulic jack 8 is no longer proportional to the speed of the motor 4.

Preferably, said processing unit 31 further comprises an element 38 for filtering said difference (received by a link 39) between the estimated motor speed and the current motor speed, before transmitting it to said element 30 (via a link 40), so as not to take dynamic modifications of high frequencies into account.

In a preferred embodiment, said element 25 comprises (integrated) means for calculating said estimated motor speed Vest, by means of the following expression:

$$\text{Vest} = (S \cdot V\text{ram})/\text{cyl}$$

wherein:
- S represents the surface of the cross-section of the piston 12 of the hydraulic jack;
- Vram is the current speed measured by the sensor 24 of the stem 13 of the hydraulic jack 8: Vram=dy/dt, y representing a move of the stem 13; and
- cyl represents the capacity of the pump 5 (that is the volume of the fluid being moved when the pump 5 achieves one revolution).

In a particular embodiment, said actuator 1 further comprises:

means 34 for determining whether the control electric signal received via the link 3 has the effect (if is applied as such to the actuator 1) to generate an increasing difference of pressure (that is a difference of pressure increasing between the chambers 9 and 10) or a decreasing difference of pressure (that is a difference of pressure dropping between the chambers 9 and 10) in the hydraulic jack 8; and means 35 being connected via a link 36 to said means 34 and being formed so as to inhibit the application, if appropriate, of said auxiliary set-point value Iaux to said electric motor 4, when said control electric signal being received has the effect of generating a decreasing difference of pressure in absolute value, that is a difference of pressure tending to decrease. To this end, said means 35 could act via a link 37 on said means 20 so that the latter transmit, via the link 21, the control order (that is said set-point value I0) received via a link 42, in case of an inhibition.

In a preferred embodiment, said means 19, 20, 31 and 35 are part of a unit 33 being integrated into the electronic control module 2.

The present invention includes, more specifically, the following aspects:
- it allows to guarantee the stop load of the actuator 1, specified by the flight qualities;
- it allows for the opening of a pressure relief valve 11, controlling the speed of the motor 4 of the actuator 1 so as to limit the overheat of the equipment; and
- it does not use the measurement by a sensor of a difference of pressure between the chambers 9 and 10 of the actuator 1, which could lack in accuracy, except for knowing the sign of this difference of pressure so as to be able to inhibit the protection function when the difference of pressure is decreasing.

The invention claimed is:

1. An electrical actuator, said actuator (1) comprising:
   - a control module (2) receiving a control electric signal and converting this control electric signal into a set-point value for an electric motor (4);
   - said electric motor (4) driving a pump (5) according to said set-point value received from said control module (2);
   - said pump (5) generating a hydraulic power allowing to move a hydraulic jack (8);
   - said hydraulic jack (8) comprising two chambers (9,10) adapted to be supplied by said pump (5) and generating the effort of the actuator (1), said chambers (9,10) being separated by a piston connected to a stem; and
   - at least one pressure relief valve (11) for limiting the effort generated by said actuator (1), said pressure relief valve (11) being automatically opened so as to implement its limitation function when the difference of pressure between the two chambers (9, 10) reaches a predetermined value, wherein it further comprises:
   - first means (18) for implementing a monitoring so as to be able to detect an opening of said pressure relief valve (11);
   - second means (19) for calculating, upon the detection of an opening of said pressure relief valve (11), an auxiliary set-point value allowing, when being applied to the electric motor (4), to limit the speed of the latter to a predetermined maximum speed being defined so as to prevent an overheat of the actuator (1) able to damage it; and third means (20) for applying to said electric motor (4) said auxiliary set-point value, instead of said set-point value, upon the detection of an opening of said pressure relief valve (11).

2. The actuator according to claim 1,
wherein said first means (18) comprise:
a first element (23) for measuring the current motor speed of said electric motor (4);
a second element (24) for measuring the current speed of the stem (13) of said hydraulic jack (8);
a third element (25) for calculating, from the current speed of said stem (13) being measured, an estimated motor speed, representing the speed of the electric motor (4) allowing to generate said measured current speed for the stem (13) of the hydraulic jack (8);
a fourth element (27) for calculating the difference between said estimated motor speed and said current motor speed; and
a fifth element (30) for comparing this difference to a predetermined maximum value, and for detecting an opening of said pressure relief valve (11), for which said auxiliary set-point value is applied to said electric motor (4), when such difference is higher than said predetermined maximum value.

3. The actuator according to claim 2,
wherein said first means (18) further comprise a sixth element (38) for filtering said difference between said estimated motor speed and said current motor speed, before transmitting it to the fifth element (30).

4. The actuator according to claim 2,
wherein said third element (25) comprises means for calculating said estimated motor speed Vest, by means of the following expression:

$$Vest=(S \cdot Vram)/cyl$$

wherein:
S represents the surface of the cross-section of the piston (12) of the hydraulic jack (8);
Vram is the measured current speed of the stem (13) of the hydraulic jack (8); and
cyl represents the capacity of the pump (5).

5. The actuator according to claim 1,
wherein it further comprises:
means (34) for determining whether the control electric signal being received has the effect of generating an increasing difference of pressure or a decreasing difference of pressure in the hydraulic jack (8); and
means (35) for inhibiting the application, if appropriate, of said auxiliary set-point value to said electric motor (4), when said control electric signal being received has the effect of generating a decreasing difference of pressure in absolute value.

6. A control system for a control surface, in particular a control surface of an aircraft, said system (13) comprising at least:
a control means (14) allowing to generate a control electric signal; and
an actuator (1) receiving said control electric signal and generating an effort on said control surface (15) as a function of said control electric signal being received,
wherein said actuator (1) is such as specified in claim 1.

7. A control method for an actuator (1) comprising:
a control module (2) receiving a control electric signal and converting this control electric signal into a set-point value for an electric motor (4);
said electric motor (4) driving a pump (5) according to said set-point value received from said control module (2);
said pump (2) generating a hydraulic power allowing to move a hydraulic jack (8);
said hydraulic jack (8) comprising two chambers (9,10) adapted to be supplied by said pump (5) and generating the effort of the actuator (1), said chambers (9,10) being separated by a piston connected to a stem; and
at least one pressure relief valve (11) for limiting the effort generated by said actuator (1), said pressure relief valve (11) being automatically opened so as to implement its limitation function when the difference of pressure between the two chambers (9,10) reaches a predetermined value,
wherein, automatically, a monitoring is implemented, so as to be able to detect an opening of said pressure relief valve (11), and upon the detection of an opening of said pressure relief valve (11), automatically:
an auxiliary set-point value is calculated, allowing, when it is applied to the electric motor (4), to limit the speed of the latter to a predetermined maximum speed being defined so as to prevent an overheat of the actuator (1) able to damage it; and
said auxiliary set-point value is applied to said electric motor (4) instead of said set-point value.

8. The method according to claim 7,
wherein, for implementing said monitoring:
the current motor speed of said electric motor (4) is measured;
the speed of the stem (13) of said hydraulic jack (8) is measured;
from the measured current speed of said stem, an estimated motor speed is calculated, representing the speed of the motor (4) allowing to generate said measured current speed for the stem (13) of the hydraulic jack (8);
the difference is calculated between said estimated motor speed and said current motor speed; and
such difference is compared to a predetermined maximum value, and an opening is detected of said pressure relief valve (11), for which said auxiliary set-point value is applied to said electric motor (4), when such difference is higher than said predetermined maximum value.

9. The method according to claim 8,
wherein said estimated motor speed Vest is calculated, by means of the following expression:

$$Vest=(S \cdot Vram)/cyl$$

wherein:
S represents the surface of the cross-section of the piston (12) of the hydraulic jack (8);
Vram is the measured current speed of the stem (13) of the hydraulic jack (8); and
cyl represents the capacity of the pump (5).

10. The method according to claim 8,
wherein said difference between said estimated motor speed and said current motor speed is filtered, before comparing it to said predetermined maximum value.

11. The method according to claim 7,
wherein automatically and repeatedly:
it is determined whether the control electric signal being received has the effect of generating an increasing difference of pressure or a decreasing difference of pressure in the hydraulic jack (8); and
if appropriate, the application of said auxiliary set-point value is inhibited, when said control electric signal being received has the effect of generating a decreasing difference of pressure in absolute value.

* * * * *